H. W. CHENEY.
CONTROLLING SYSTEM.
APPLICATION FILED APR. 16, 1906.
1,127,185.
Patented Feb. 2, 1915.
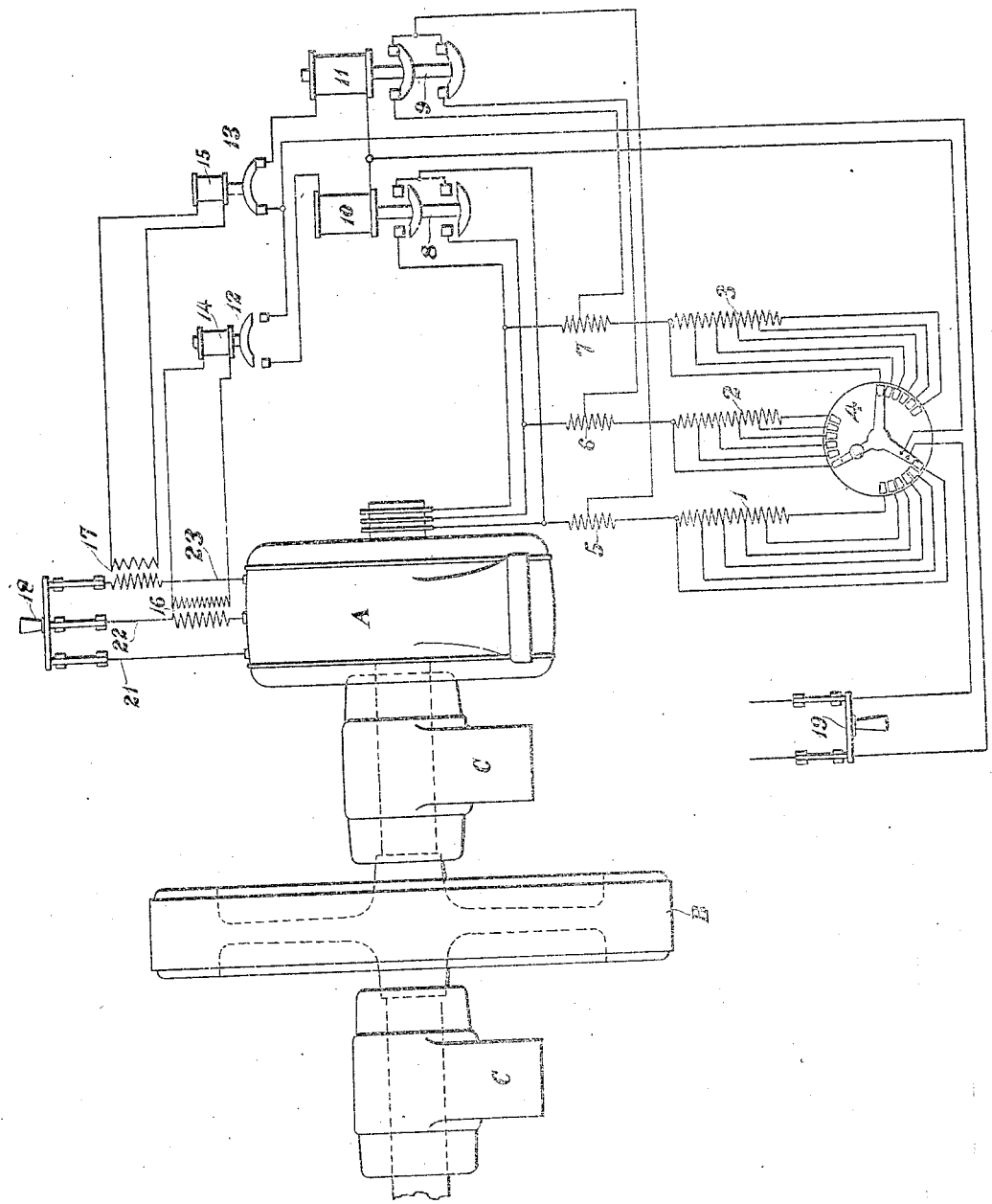
WITNESSES
INVENTOR
Herbert W. Cheney
BY
Chas. E. Lord
ATTORNEY

UNITED STATES PATENT OFFICE.

HERBERT W. CHENEY, OF NORWOOD, OHIO, ASSIGNOR, BY MESNE ASSIGNMENTS, TO ALLIS-CHALMERS MANUFACTURING COMPANY, A CORPORATION OF DELAWARE.

CONTROLLING SYSTEM.

1,127,185.

Specification of Letters Patent.

Patented Feb. 2, 1915.

Application filed April 16, 1906. Serial No. 311,845.

*To all whom it may concern:*

Be it known that I, HERBERT W. CHENEY, citizen of the United States, residing at Norwood, in the county of Hamilton and State of Ohio, have invented certain new and useful Improvements in Controlling Systems, of which the following is a full, clear, and exact specification.

My invention relates to motor control systems and particularly to automatic control systems for electric motors carrying a varying load.

It is the object of this invention to provide an improved system of control which is particularly applicable to a motor driving a variable load.

The single figure of the drawing shows one embodiment of my invention, partly diagrammatically.

A is a motor which is to drive a variable load. This motor is shown as three-phase induction motor, though obviously my invention is not limited to this type of motor, but is equally applicable to motors of other types. Mechanically connected to the rotating element of this motor, as by being mounted on the same shaft, is a fly-wheel B. Proper bearings C are provided. The motor A is supplied from any suitable three-phase source by mains 21, 22, and 23.

In the rotor circuit of the motor is a starting resistance 1, 2, 3, these three parts of the resistance being shown star connected. The starting resistance is arranged to be gradually cut out by the usual manual controller 4. Also connected in the rotor circuit, and in series with the starting resistance 1, 2, 3, is a regulating resistance 5, 6, 7, which is arranged to be short-circuited under certain conditions by the electrically operated switches 8 and 9. Each of these switches short-circuits one section of the regulating resistance, the number of sections being the same as the number of solenoid switches, two of them being here shown. The solenoids 10 and 11 of these switches are supplied from any suitable source of current through the switch 19, and it is necessary that the arm of the starting controller 4 be in running position, as shown in the drawing, in order that the circuits of solenoids 10 and 11 be completed. The solenoids 10 and 11, are also controlled by solenoid switches 12 and 13, the solenoids 14 and 15 of which are responsive to the strength of the current supplied to the primary or stator circuit of motor A, as being connected to said circuit through series transformers 16 and 17. These transformers have different ratios of transformation so that switch 12 is opened at a smaller current than is switch 13. It is obvious that the transformers may have the same ratio of transformation, and the number of turns on 14 and 15 varied to get the same result.

The operation of the system is as follows:—The motor A is started by closing the switch 18 and by cutting out the starting resistance 1, 2, 3, by the controller 4. After the starting controller is in running position, but not until then, the circuits of solenoids 10 and 11 may be completed by switches 12 and 13. If the load on the motor is light there is comparatively small current in the mains 21, 22, and 23 and the switches 12 and 13 are closed to energize solenoids 10 and 11 to short-circuit the regulating resistance 5, 6, 7. The motor now runs to drive the load and to supply energy to the fly-wheel B.

If a load on the motor is increased the current in the mains rises. If the load exceeds a predetermined amount, the current supplied rising proportionately, the solenoid 14 is energized sufficiently strongly to open switch 12, thus deënergizing solenoid 10, and causing switch 8 to open to insert the upper half of resistance 5, 6, 7, in the rotor circuit. This increases the slip of the motor, allowing it to slow down somewhat, so that the fly-wheel may give up part of the energy it has stored to help drive the increased load. A still greater rise in the load causes the other half of the regulating resistance 5, 6, 7 to be cut in, by the action of switches 13 and 9, thereby permitting a still further drop in speed, and a still greater assisting action from the fly-wheel. When the load falls off the resistance is again cut out of the rotor circuit, thus causing the motor to speed up again. The value of the load when the resistance is cut out of circuit is less than when the resistance is cut in because it requires less current to hold up switches 12 and 13 than to raise said switches.

It is obvious that the solenoids 10 and 11, could be readily omitted and that the solenoids 14 and 15 could be arranged to operate the switches 8 and 9 directly.

Although I have described what I now consider to be the preferred embodiment of my invention, I do not wish to be limited to the precise structure shown and described, but claim as mine all such obvious modifications as readily occur to one skilled in the art.

What I claim as new, and desire to secure by Letters Patent is:—

1. In combination, an induction motor, a fly-wheel mechanically connected thereto, a starting resistance in the secondary circuit of said motor, manually operated means for cutting out said starting resistance, a second resistance in said secondary circuit, and automatic means for shunting said second resistance after the starting resistance has been cut out and for opening said shunt whenever the current in the primary circuit of the motor exceeds a predetermined value.

2. In combination, a three-phase induction motor, a fly-wheel mechanically connected thereto, a starting resistance in the rotor circuit of the motor, means for cutting out said starting resistance, a second resistance arranged in said rotor circuit, a plurality of electrically operated switches for cutting said second resistance into or out of circuit step by step in accordance with the rise or fall of load on the motor, and connections whereby said second resistance can only be cut out after the starting resistance has been completely cut out.

3. In combination with an electric motor, a fly-wheel driven thereby, a starting resistance therefor, a manually-controlled switch for cutting said resistance out of circuit, and a plurality of magnetically-actuated switches arranged to cut portions of said resistance into circuit, the actuating magnet windings being connected and arranged to actuate said switches successively when the load on the motor exceeds predetermined amounts.

4. In combination with an electric motor, a fly-wheel driven thereby, a starting resistance therefor, a manually-controlled switch for cutting said resistance out of circuit, and means controlled by the load on said motor for cutting portions of said resistance successively into circuit when the load on the motor exceeds predetermined amounts.

5. In combination with an electric motor, a fly-wheel driven thereby, a starting resistance therefor, a plurality of magnetically-actuated contacts for short-circuiting portions of said resistance, a manually-operated starting switch controlling the actuating magnets for said contacts, magnetically-actuated means controlling said magnet windings, and connections for supplying to the actuating winding of said controlling means a current varying with the load on the motor.

6. In combination, an induction motor, a fly-wheel driven thereby, a resistance in the secondary circuit of said motor, a manually-controlled starting switch for cutting said resistance out of circuit, a magnetically-actuated switch for cutting a portion of said resistance into circuit, and connections for supplying to the actuating winding of said switch a current varying with the load on the motor.

7. In combination with an electric motor, a fly-wheel driven thereby, a resistance in a circuit therewith, magnetically-actuated contacts for short-circuiting portions of said resistance, and two switches jointly controlling the actuating magnets for said contacts, said switches being controlled one by hand and the other automatically by the load on the motor.

8. In combination with an electric motor, a fly-wheel driven thereby, a resistance in a circuit therewith, magnetically-actuated contacts for short-circuiting portions of said resistance, and two switches jointly controlling the actuating magnets for said contacts, said switches controlled one by hand and the other magnetically, and connections for supplying to the controlling magnet of the latter switch a current varying with the load on the motor.

9. In a motor control system, a motor, a fly-wheel driven thereby, a resistance in the circuit of said motor, and means for manually controlling a part of said resistance and for automatically controlling another part of said resistance, the automatic control being effective only after the manual control has been fully exercised.

10. In a motor control system, a motor, a fly-wheel driven thereby, a resistance therefor, and means for successively purely manually and jointly manually and automatically controlling parts of said resistance, the automatic control being effective only after the manual control has been exercised.

11. In combination, an induction motor, a fly-wheel driven thereby, a resistance in the secondary circuit of said motor, a manually controlled starting switch for varying the resistance of said secondary circuit, a magnetically actuated switch for also varying the resistance of said circuit, and connections for supplying to the actuating windings of said switch a current varying with the load on the motor, said automatically actuated switch being operative only when said manually controlled switch has been operated to cut out a portion of said resistance.

12. In combination with an electric motor, a fly-wheel driven thereby, a resistance adapted to be inserted in the motor circuit to cause the motor to run at reduced speed to permit the fly-wheel to give up a portion of its energy, and means for purely manually controlling a part of said resistance and for jointly automatically and manually controlling another part of said resistance.

13. In combination, an induction motor, a variable resistance in the secondary of said motor, means for manually controlling a portion of said resistance, and means for automatically controlling another portion of said resistance and operable only when a part of the manually controlled portion has been cut out.

14. In combination with an electric motor, a resistance therefor, and means for purely manually controlling a part of said resistance and for automatically controlling another part of said resistance, said means effecting automatic control only after a portion of said manually controlled part of said resistance has been cut out.

15. In a motor control system, a motor, a controlling resistance therefor comprising a plurality of sections in series arrangement, means for manually controlling one section of said resistance and for subsequently automatically controlling another section of said resistance, said automatic control being effective only when a portion of said manually controlled section has been rendered inactive.

16. In combination with an electric motor, a fly-wheel driven thereby, a resistance in the circuit of said motor, means for varying said resistance, magnetically actuated contacts for varying the effect of portions of said resistance, and a plurality of switches jointly controlling the actuating magnets for said contacts, one of said switches being controlled by hand and operative only after a portion of said resistance has been cut out by said first mentioned resistance varying means, and the remaining switch or switches being automatically controlled by the load on the motor.

17. In a motor control system, a motor, a resistance in the circuit of said motor, means operative at the will of the operator for controlling the resistance of said circuit, and means for automatically controlling said resistance, said latter means being operative only after a portion of said resistance has been cut out by said first mentioned means.

In testimony whereof I affix my signature, in the presence of two witnesses.

HERBERT W. CHENEY.

Witnesses:
 GEO. B. SCHLEY,
 FRED J. KINSEY.